United States Patent
Onogi (10) Patent No.: US 8,651,350 B2
(45) Date of Patent: Feb. 18, 2014

(54) ACCESSORY MOUNTING STRUCTURE

(75) Inventor: Takumi Onogi, Sakai (JP)

(73) Assignee: Shimano Inc., Osaka (JP)

( * ) Notice: Subject to any disclaimer, the term of this patent is extended or adjusted under 35 U.S.C. 154(b) by 11 days.

(21) Appl. No.: 13/276,379

(22) Filed: Oct. 19, 2011

(65) Prior Publication Data

US 2013/0098959 A1  Apr. 25, 2013

(51) Int. Cl.
   *B62J 11/00*  (2006.01)

(52) U.S. Cl.
   USPC ........... 224/421; 224/419; 224/420; 224/425; 224/441

(58) Field of Classification Search
   USPC ......... 224/419, 420, 425, 431, 441, 547, 548, 224/554, 421, 558; 248/289.11, 292.14, 248/74.4, 74.5, 229.14, 229.24, 230.5, 248/231.61, 216.6, 220.21, 220.22; 74/551.1, 551.3–551.5, 551.8; 280/288.4, 727, 728.2
   See application file for complete search history.

(56) References Cited

U.S. PATENT DOCUMENTS

| 2,533,190 | A | * | 12/1950 | English | 440/109 |
| 4,596,370 | A | | 6/1986 | Adkins | |
| 5,040,712 | A | * | 8/1991 | Pesonen et al. | 224/547 |
| 6,305,241 | B1 | | 10/2001 | Masui et al. | |
| 6,390,427 | B1 | | 5/2002 | McConnell et al. | |
| 2004/0108348 | A1 | * | 6/2004 | Barnes | 224/413 |
| 2010/0127030 | A1 | * | 5/2010 | Muhlberger | 224/420 |
| 2010/0246199 | A1 | | 9/2010 | Ma et al. | |

FOREIGN PATENT DOCUMENTS

| DE | 92006159 | 4/1992 |
| DE | 29819852 U1 | 3/1999 |
| DE | 10 2009 030 053 A1 | 12/2010 |
| EP | 0708016 A1 | 4/1996 |
| EP | 1 914156 A1 | 4/2008 |
| WO | 2005/018400 A1 | 3/2005 |

OTHER PUBLICATIONS

European Search Report of corresponding EP Application 12 18 4871.7 dated Dec. 21, 2012.

* cited by examiner

*Primary Examiner* — Adam Waggenspack
(74) *Attorney, Agent, or Firm* — Global IP Counselors (57) ABSTRACT

A bicycle accessory mounting structure is provided with a base member and a first stem member. The first stem member includes a mounting opening. The base member includes an accessory attachment portion and a mounting portion. The base member extends through the mounting opening. The base member is slidably supported on the first stem member within the mounting opening.

6 Claims, 7 Drawing Sheets

ACCESSORY MOUNTING STRUCTURE

BACKGROUND

1. Field of the Invention

This invention generally relates to an accessory mounting structure, for specifically, the present invention relates to an accessory mounting structure for mounting a bicycle accessory to a bicycle handlebar stem.

2. Background Information

Currently, many different types of separate add-on bicycle accessories are available on the market. Often, these add-on bicycle accessories are configured to be detachably mounted on a handlebar of a bicycle. Depending on the type of add-on bicycle accessory, a preferred position for the add-on bicycle accessory is at or near the center of the handlebar. The center position of the handlebar allows the rider to view the add-on bicycle accessory. A display device such as a cycle computer is one example of such an add-on bicycle accessory that is desirable to be mounted at or near the center of the handlebar. A bicycle headlamp is another example of such an add-on bicycle accessory that is desirable to be mounted at or near the center of the handlebar. For example, U.S. Pat. No. 6,305,241 discloses a cycle computer that is detachably mounted to the handlebar stem such that the cycle computer is located at the center of the handlebar. While the bicycle accessory mounting structure of this patent works well, the bicycle accessory mounting structure substantially increases the size of the bicycle handlebar stem.

SUMMARY

One aspect is to provide a bicycle accessory mounting structure that adjustably mounts a bicycle accessory to a handlebar stem and that can look like a handlebar stem when used without the bicycle accessory.

In view of the state of the known technology, a bicycle accessory mounting structure is provided that comprises a base member and a first stem member. The first stem member includes a mounting opening. The base member includes an accessory attachment portion and a mounting portion. The base member extends through the mounting opening. The base member is slidably supported on the first stem member within the mounting opening.

The above aspect and other objects, features, aspects and advantages of the disclosed bicycle accessory mounting structure will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
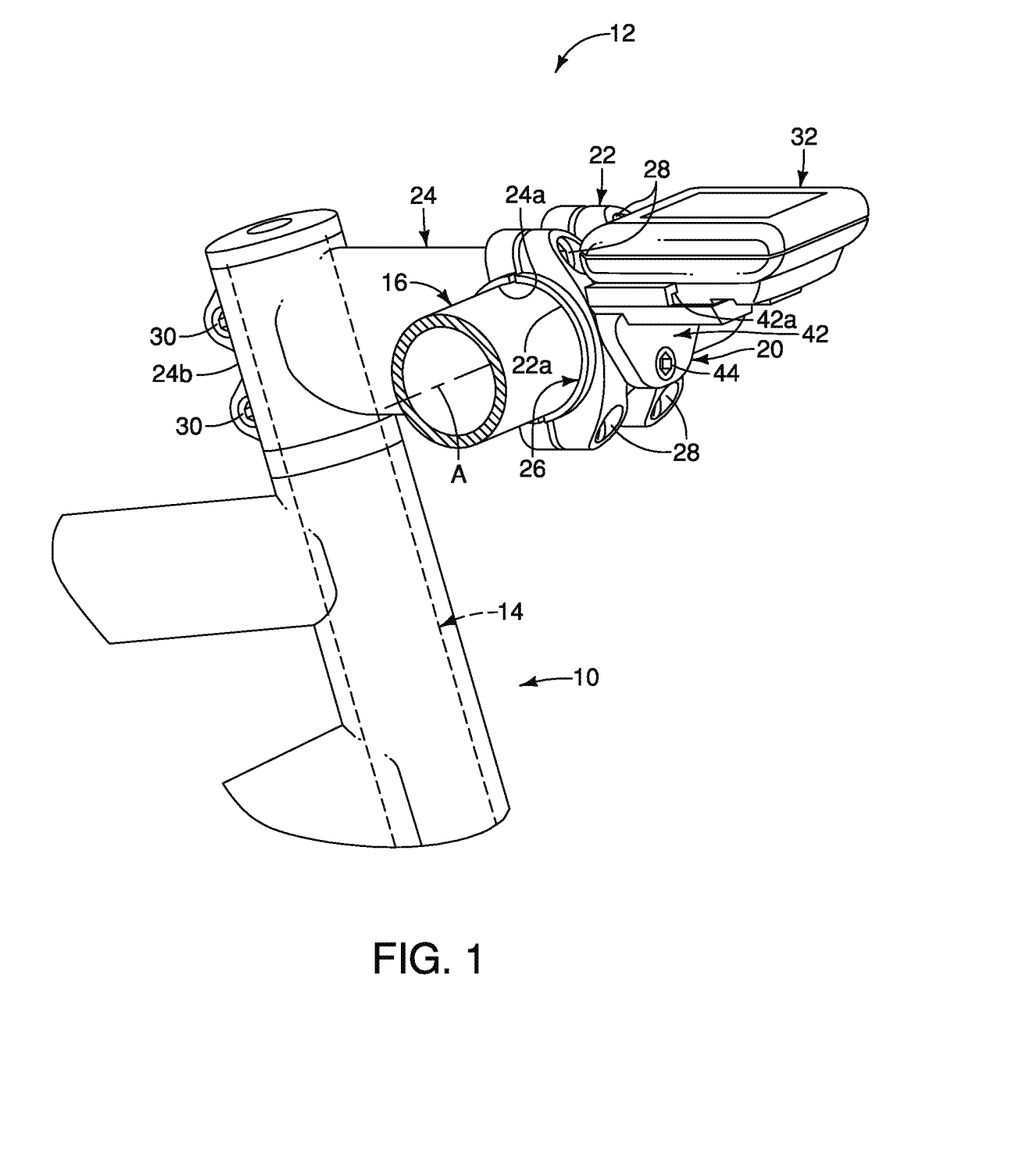
FIG. 1 is a front right side perspective view of a portion of a bicycle that is equipped with a bicycle accessory mounting structure in accordance with a first embodiment.

Referring initially to FIG. 1, a portion of a bicycle 10 is illustrated that is equipped with a bicycle accessory mounting structure 12 in accordance with a first embodiment. Basically, the bicycle accessory mounting structure 12 is detachably mounted between a steerer tube 14 and a handlebar 16. The bicycle accessory mounting structure 12 includes a base member 20 and a first stem member 22. The base member 20 and the first stem member 22 can be used to retrofit an existing bicycle handlebar stem. Alternatively, the bicycle accessory mounting structure 12 can further include a second stem member 24 such that the bicycle accessory mounting structure 12 can be used to replace an existing bicycle handlebar stem. The first and second stem members 22 and 24 can be constructed of any rigid material that is suitable for a handlebar stem, such as aluminum, steel, titanium, carbon fiber, carbon fiber over aluminum, etc.

Also with the base member 20 detached, the first and second stem members 22 and 24 form a general bicycle handlebar stem that supports the handlebar 16 on the steerer tube 14 in a conventional manner. In particular, the first and second stem members 22 and 24 includes first and second engagement surfaces 22a and 24a that define a support passage 26 for the bicycle handlebar 16. The first and second engagement surfaces 22a and 24a are curved surfaces that are concaved to clamp the bicycle handlebar 16. In this way, the first and second stem members 22 and 24 can be used as a bicycle handlebar stein when a bicycle accessory is not being used.

The second stem member 24 can have a variety of configurations. For example, as illustrated, the second stem member 24 can detachably attached to the first stem member 22 by four fasteners 28 (e.g., securingbolts). Thus, the first and second stem members 22 and 24 together with fasteners 28 form a releasable connecting structure that pulls fastening ends of the first and second stem members 22 and 24 together. However, the first and second stem members 22 and 24 can be integrally formed together as a one-piece, unitary member, if needed and/or desired.

As seen in FIG. 1, the second stem member 24 includes a steerer tube attachment portion 24b that attaches to the steerer tube 14 in a conventional manner. While the steerer tube attachment portion 24b of the second stem member 24 is a one-piece, unitary member with two fasteners 30 for clamping onto the steerer tube 14, it will be apparent from this disclosure that the steerer tube attachment portion 24b of the second stem member 24 can be made of two or more pieces as needed and/or desired. Moreover, while a threadless or clamping type of stem is illustrated that clamps around the steerer tube and extends above the headset, it will be apparent to those skilled in the art form this disclosure that the steerer tube attachment portion 24b of the second stem member 24 can be configured as a quill type of stem that inserts into the steerer tube 14 and that does not extend above the headset. In addition, the second stem member 24 can be provided with other features such as a joint for adjusting the position of the handlebar 16 relative to the steerer tube 14.

In the first illustrated embodiment, the bicycle accessory mounting structure 12 includes a bicycle accessory 32 in the form of a cycle computer as one example of a bicycle accessory that can used with the bicycle accessory mounting structure 12. However, the bicycle accessory mounting structure 12 is not limited to use with a cycle computer. The bicycle accessory mounting structure 12 is especially useful with other display type devices such as a smart phone, a navigation device, etc. Moreover, the bicycle accessory 32 can be a device without any display such as a headlamp, a speaker, a user operated control device, etc.

Figure 2:
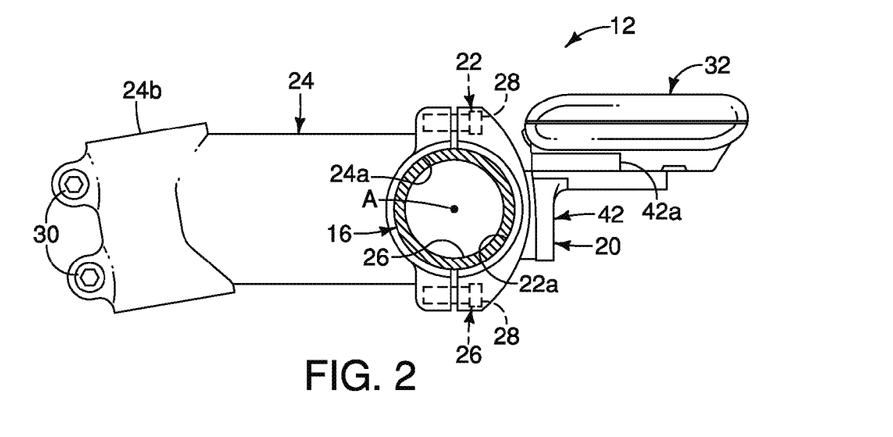
FIG. 2 is a right side elevational view of the bicycle accessory mounting structure illustrated in FIG. 1 with the bicycle accessory in a center orientation that is substantially horizontal.
Figure 3:
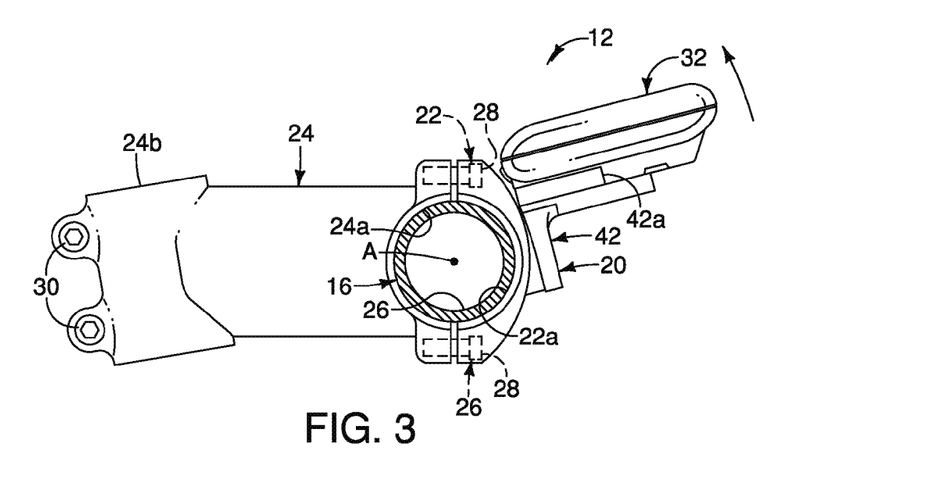
FIG. 3 is a right side elevational view of the bicycle accessory mounting structure illustrated in FIGS. 1 and 2 with the bicycle accessory in an upward inclined orientation.
Figure 4:
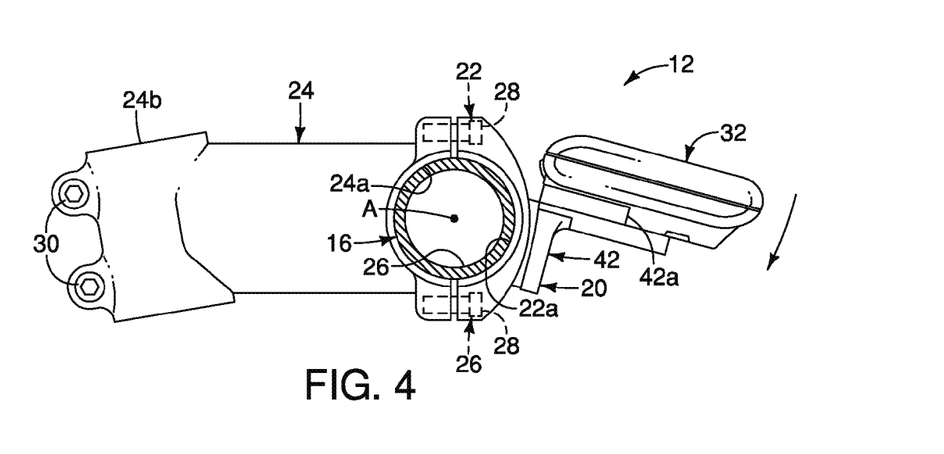
FIG. 4 is a right side elevational view of the bicycle accessory mounting structure illustrated in FIGS. 1 to 3 with the bicycle accessory in a downward inclined orientation.

As seen in FIGS. 2 to 4, the bicycle accessory mounting structure 12 is configured and arranged to allow the rider to adjust the angular position of the bicycle accessory 32 relative to a longitudinal axis A of the handlebar 16. In FIG. 2, the base member 20 is adjusted relative to the first stem member such that the bicycle accessory 32 is held in a center orientation that is substantially horizontal. In FIG. 3, the base member 20 is adjusted relative to the first stem member 22 such that the bicycle accessory 32 is held in an upward inclined orientation relative to the second stem member 24. In FIG. 4, the base member 20 is adjusted relative to the first stein member 22 such that the bicycle accessory 32 is held in a downward inclined orientation relative to the second stem member 24.

Figure 5:
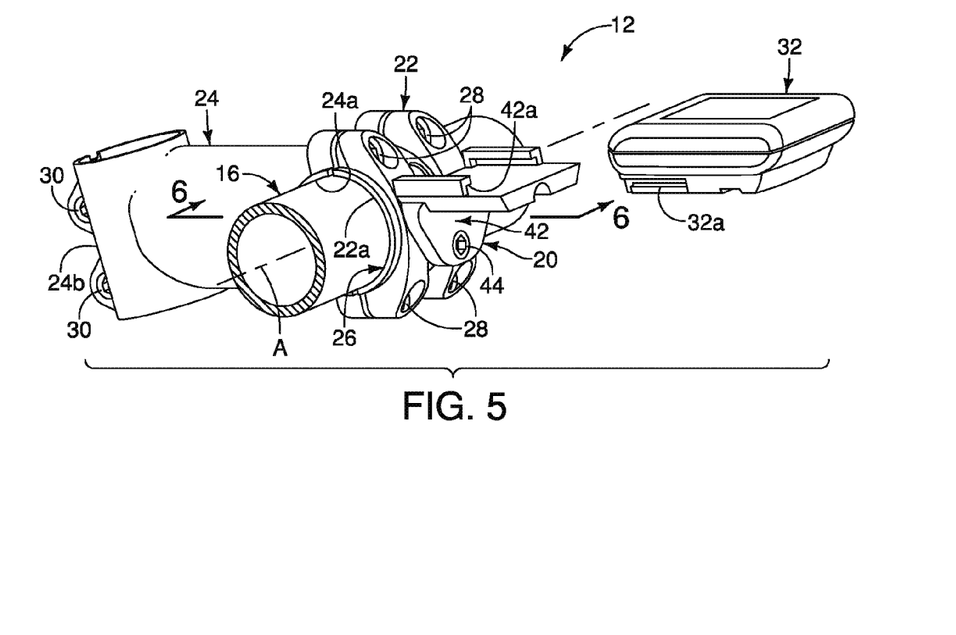
FIG. 5 is a front right side perspective view of the bicycle accessory mounting structure illustrated in FIGS. 1 to 4 with the bicycle accessory in a detached position.
Figure 6:
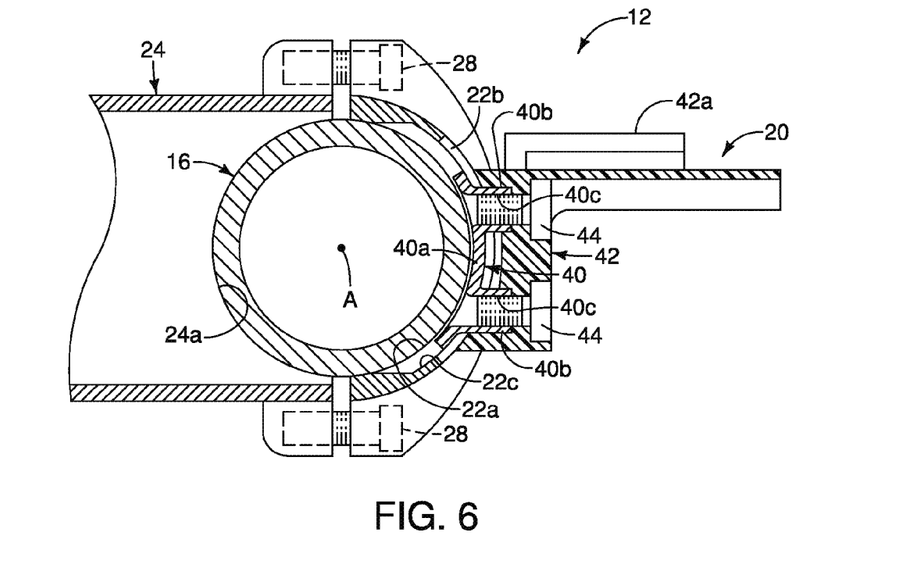
FIG. 6 is a cross sectional view of the bicycle accessory mounting structure illustrated in FIGS. 1 to 5 as seen along section line 6-6 in FIG. 5.

As seen in FIGS. 5 and 6, the base member 20 includes a mounting portion 40 that is attached to the first stem member 22, and an accessory attachment portion 42 that detachably supports the bicycle accessory 32. The accessory attachment portion 42 and the mounting portion 40 are separate members in the first embodiment. In particular, two fasteners 44 (e.g., mounting bolts) are used to detachably mount the accessory attachment portion 42 to the mounting portion 40. Here, in the first embodiment, the accessory attachment portion 42 is detachable from the mounting portion 40 while the mounting portion 40 remains secured to the handlebar 16 by the first and second stem members 22 and 24.

Figure 7:
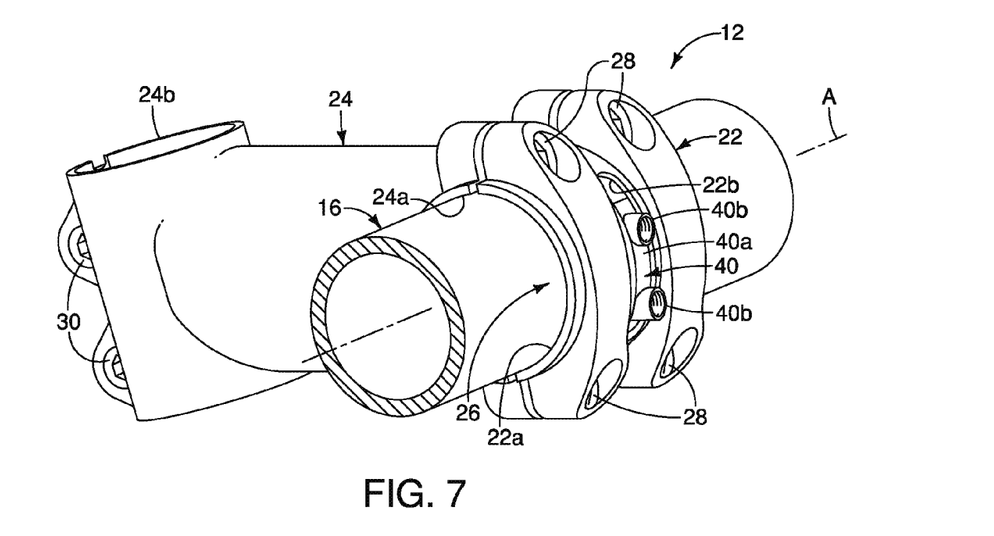
FIG. 7 is a front right side perspective view of the bicycle accessory mounting structure illustrated in FIGS. 1 to 6 with the accessory attachment portion of the base member and the bicycle accessory detached.
Figure 8:
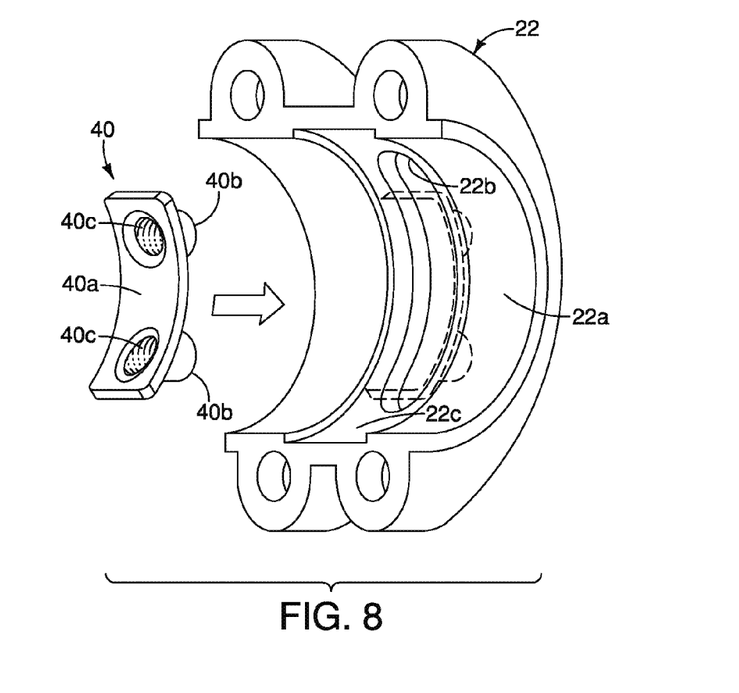
FIG. 8 is a rear right side perspective view of the first stein member and the mounting portion of the bicycle accessory mounting structure illustrated in FIGS. 1 to 6.

As seen in FIGS. 6 to 8, the mounting portion 40 of the base member 20 extends through a mounting opening 22b of the first stem member 22 for attachment to the accessory attachment portion 42 using the fasteners 44. The mounting opening 22b of the first stem member 22 is an elongated slot that extends in a circumferential direction relative to the axis A of the handlebar 16. In this way, the mounting portion 40 of the base member 20 is slidably supported on the first stem member 22 within the mounting opening 22b. Preferably, in the first embodiment, the mounting portion 40 of the base member 20 has a first (base) portion 40a and a pair of second (shaft) portions 40b. The first portion 40a of the mounting portion 40 is slidably disposed in a recess 22c that formed in a first (rear) surface of the first stem member 22, while the second portions 40b extend through the mounting opening 22b of the first stem member 22. Each of the second portions 40b of the mounting portion 40 includes a threaded hole 40c that is threadedly engaged with one of the fasteners 44 (e.g., mounting bolts) such that the accessory attachment portion 42 is secure to the mounting portion 40. In other words, in the first embodiment, the second portions 40b of the base member 20 forms at least two threaded holes 40b that are each threadedly engaged with one of the fasteners 44 (e.g., mounting bolts) such that the accessory attachment portion 42 is secure to the mounting portion 40. With this arrangement, once the fasteners 28 are tightened, the first and second engagement surfaces 22a and 24a will clamp onto the handlebar 16 to fix the position of the handlebar 16 relative to the first and second stem members 22 and 24. However, with the handlebar 16 between the first and second stem members 22 and 24, the base member 20 can still be adjusted. In particular, the first portion 40a of the mounting portion 40 slides within the recess 22c. Upon the fasteners 44, the first portion 40a of the mounting portion 40 will be pulled firmly against the first (rear) surface of the first stem member 22 to fix the position of the base member 20 relative to first and second stem members 22 and 24.

In the first embodiment, the accessory attachment portion 42 has a pair of accessory mounting rails 42a that engage a pair of mating rails 32a of the bicycle accessory 32. Preferably, the accessory mounting rails 42a of the accessory attachment portion 42 and the mating rails 32a of the bicycle accessory 32 mate together with a snap-fit. However, it will be apparent from this disclosure that the accessory attachment portion 42 can have a variety of configurations for mounting the bicycle accessory 32. For example, the accessory attachment portion 42 can be merely provided with openings for using plastic ties to secure the bicycle accessory 32 to the attachment portion 42. Alternatively, the attachment portion 42 can be provided with several different attachment arrangements to be compatible with various manufacturers' devices. Thus, the precise configuration of the accessory attachment portion 42 will not be discussed or illustrated in detail herein.

Figure 9:
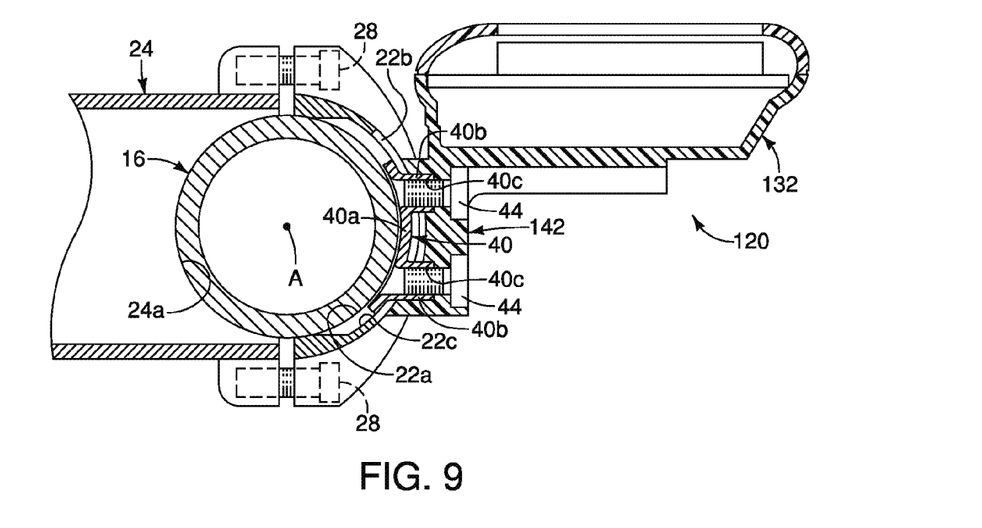
FIG. 9 is a cross sectional view, similar to FIG. 6, of a bicycle accessory mounting structure in accordance with a second embodiment.

Referring now to FIG. 9, a bicycle accessory mounting structure 112 in accordance with a second embodiment will now be explained. Basically, the bicycle accessory mounting structure 112 is identical to the bicycle accessory mounting structure 12, discussed above, except that bicycle accessory mounting structure 112 has been provided with a modified base member 120. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, in the second embodiment, the base member 120 uses the mounting portion 40 of the first embodiment with a modified accessory attachment portion 112 in which the modified accessory attachment portion 142 is integrally formed with a bicycle accessory 132. Thus, the bicycle accessory 132 is not detachable from the modified accessory attachment portion 142 in the second embodiment. Of course, the modified accessory attachment portion 142 and the bicycle accessory 132 are detachable from as a unit from the mounting portion 40 using the fasteners 44 similar to the first embodiment.

Figure 10:
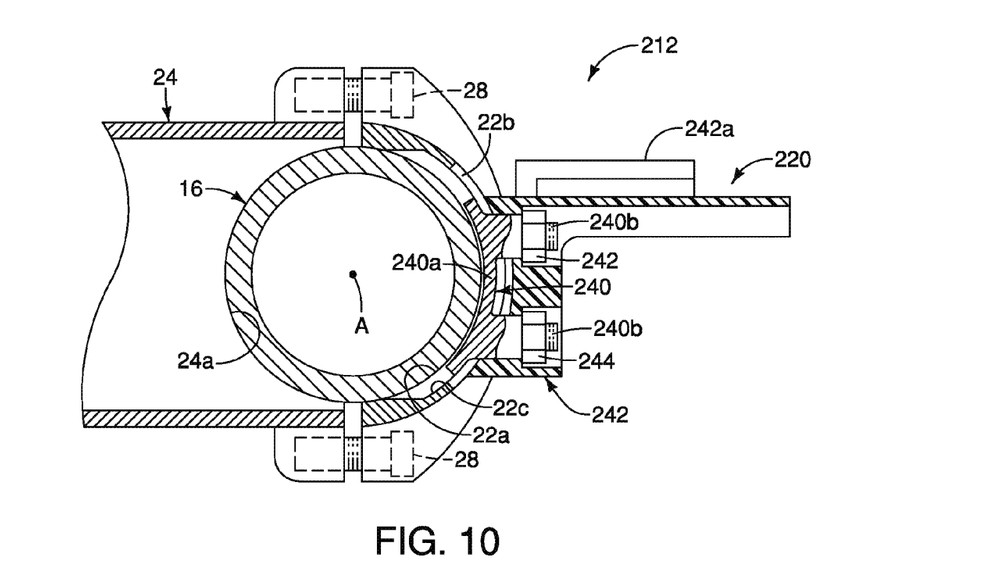
FIG. 10 is a cross sectional view, similar to FIG. 6, of a bicycle accessory mounting structure in accordance with a third embodiment.

Referring now to FIG. 10, a bicycle accessory mounting structure 212 in accordance with a third embodiment will now be explained. Basically, the bicycle accessory mounting structure 212 is identical to the bicycle accessory mounting structure 12, discussed above, except that the bicycle accessory mounting structure 212 has been provided with a modified base member 220. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Here, in the third embodiment, the modified base member 220 is provided with a modified mounting portion 240 and a modified accessory attachment portion 242. The modified mounting portion 240 has a first (base) portion 210a and a pair of second (shaft) portions 240b. The first portion 240a of the modified mounting portion 240 is slidably disposed in the recess 22c that formed in the first (rear) surface of the first stem member 22, while the second portions 240b extend through the mounting opening 22b of the first stem member 22. Each of the second portions 240b of the modified mounting portion 240 is a threaded shaft that is threadedly engaged with a fastener 244 (e.g., a mounting nut) such that the accessory attachment portion 242 is secure to the modified mounting portion 40.

Figure 11:
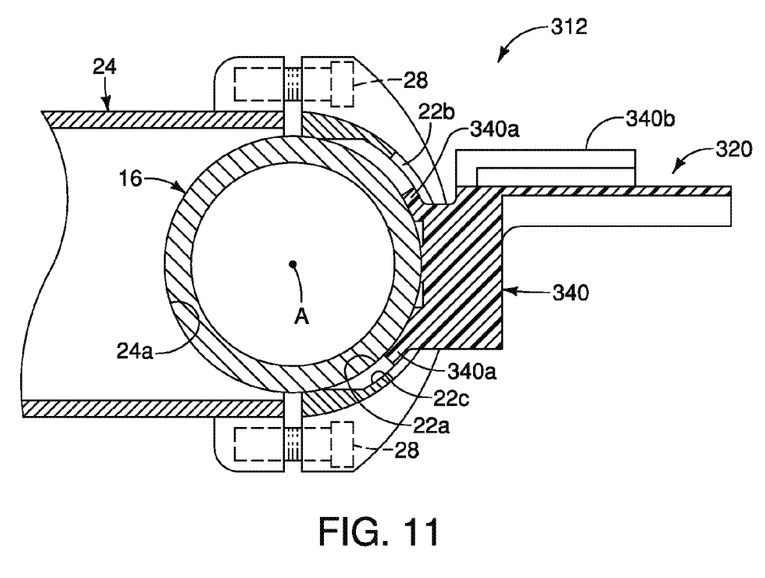
FIG. 11 is a cross sectional view, similar to FIG. 6, of a bicycle accessory mounting structure in accordance with a fourth embodiment.

Referring now to FIG. 11, a bicycle accessory mounting structure 312 in accordance with a fourth embodiment will now be explained. Basically, the bicycle accessory mounting structure 312 is identical to the bicycle accessory mounting structure 12, discussed above, except that the bicycle accessory mounting structure 312 has been provided with a modified base member 320. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Here, in the fourth embodiment, the modified base member 320 is provided with a modified mounting portion 340 and a modified accessory attachment portion 342 that are integrated together as a one-piece, unitary member such as a one-piece plastic member. The modified mounting portion 340 has a pair of first portions 340a and a second portion 340b. The first portions 340a of the modified mounting portion 340 are slidably disposed in the recess 22c that thrilled in the first (rear) surface of the first stem member 22. Preferably, the first portions 340a are deformable tabs that are squeezed between the handlebar 16 and the first (rear) surface of the first stem member 22 upon tightening the fasteners 28. However, with the handlebar 16 between the first and second stem members 22 and 24, the base member 320 can still be adjusted without loosening the fasteners 28. In particular, the first portions 340a are dimensioned such that the first portions 340a are frictionally retained between the handlebar 16 and the first stem member 22 in a desired position, but the rider can still adjust the position of the base member 320 without loosening the fasteners 28. Alternatively, the first portions 340a are dimensioned such that with the handlebar 16 retained between the first and second stem members 22 and 24, the base member 320 can be adjusted by slightly loosening the fasteners 28.

Figure 12:
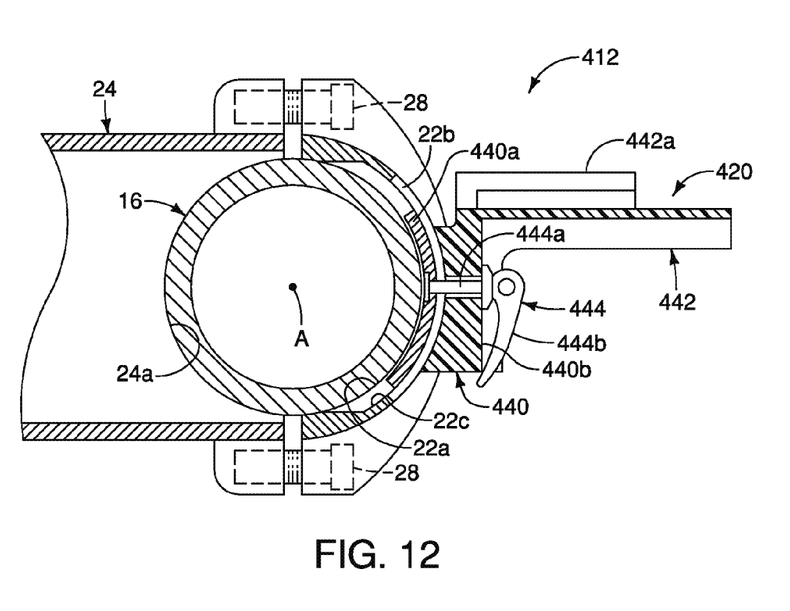
FIG. 12 is a cross sectional view, similar to FIG. 6, of a bicycle accessory mounting structure in accordance with a fifth embodiment.

Referring now to FIG. 12, a bicycle accessory mounting structure 412 in accordance with a fifth embodiment will now be explained. Basically, the bicycle accessory mounting structure 412 is identical to the bicycle accessory mounting structure 12, discussed above, except that the bicycle accessory mounting structure 412 has been provided with a modified base member 420. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

Here, in the fifth embodiment, the modified base member 420 is provided with a modified mounting portion 440 and a modified accessory attachment portion 442. The modified mounting portion 440 has a first portion 440a and a second portion 440b. The first portion 440a of the modified mounting portion 440 is slidably disposed in the recess 22c of the first stem member 22. The second portion 440b of the modified mounting portion 440 is integrally formed with the modified accessory attachment portion 442. A quick release fastener 444 is provided for attaching the second portion 440b of the modified mounting portion 440 and the modified accessory attachment portion 442 to the first portion 440a of the modified mounting portion 440. The quick release fastener 444 is one example of a tool-less mounting structure that can be used to secure the modified base member 420 to the first stem member 22. In the fifth embodiment, the quick release fastener 444 includes a shaft 444a and a cam member 444b. The shaft 444a has a first end connected to the first portion 440a and a second end threaded to a pivot member of the cam member 444b. The cam member 444b has a lever that is pivoted on the pivot member of the cam member 444b between a locking position (shown in FIG. 12) and an unlocking position (not shown). The quick release fastener 444 is a relatively conventional tool-less mounting structure that is used in the bicycle field. Thus, the precise construction of the quick release fastener 444 will not be discussed and/or illustrated in detail herein.

Figure 13:
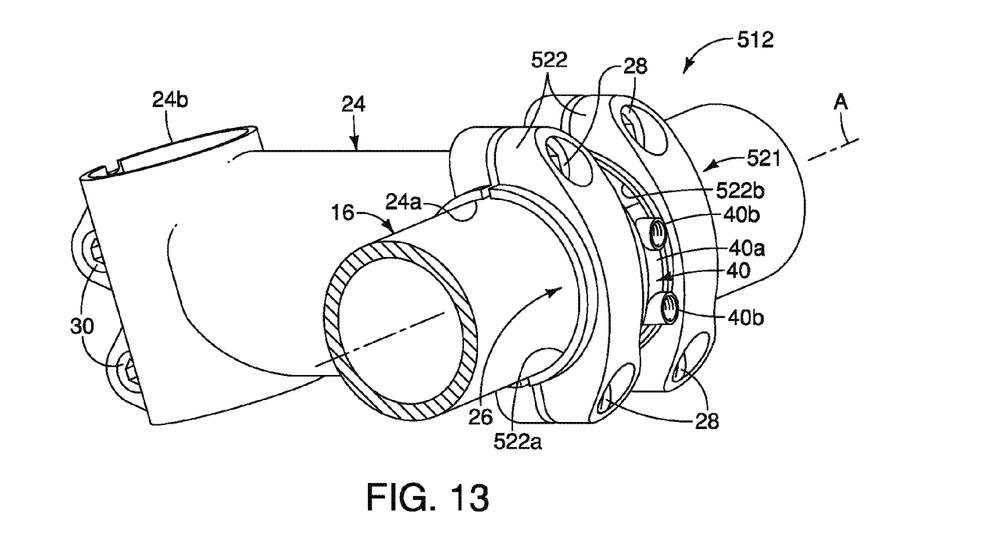
FIG. 13 is a front right side perspective view of a bicycle accessory mounting structure in accordance with a sixth embodiment with the accessory attachment portion of the base member and the bicycle accessory detached.
Figure 14:
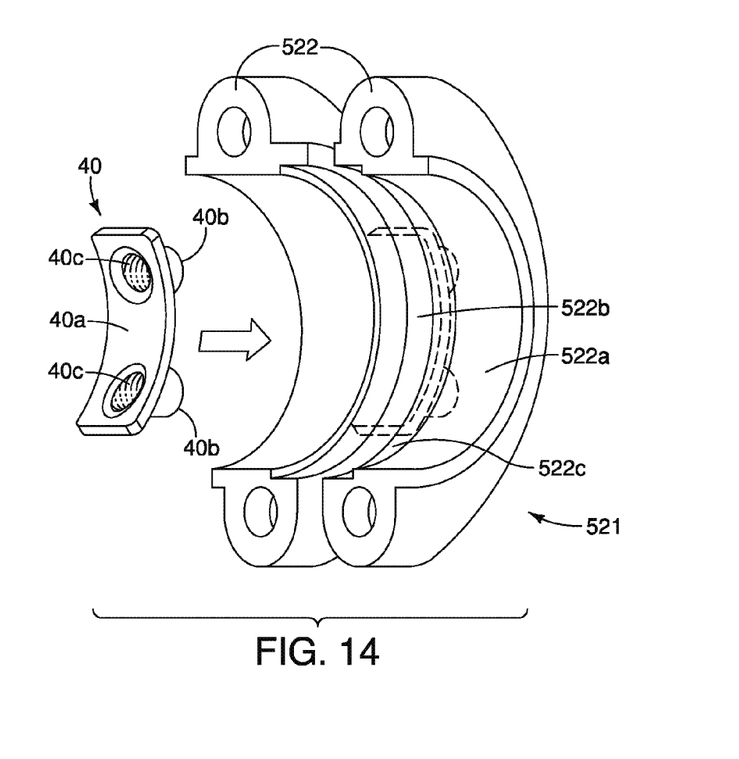
FIG. 14 is a rear right side perspective view of the first stem member and the mounting: portion of the bicycle accessory mounting structure illustrated in FIG. 13.

Referring now to FIGS. 13 and 14, a bicycle accessory mounting structure 512 in accordance with a sixth embodiment will now be explained. Basically, the bicycle accessory mounting structure 512 is identical to the bicycle accessory mounting structure 12, discussed above, except that the bicycle accessory mounting structure 512 has been provided with a modified first stem member 521. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

Here, in the sixth embodiment, the modified first stem member 521 is provide with two clamping portions 522 that are attached to the second stem member 24 by the fasteners 28. The clamping portions 522 are mirror images of each other and each have a first engagement surface 522*a*. Upon attachment of the clamping portions 522 to the handlebar 16, the clamping portions 522 define a mounting opening 522*b* therebetween. Preferably, each of the clamping portions 522 has a recess 522*c* in its rear surface thr slidably receiving the first portion 40*a* of the mounting portion 40 in the same manner as the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle accessory mounting structure in the normal riding position on a horizontal (level) surface. Accordingly, these terms, as utilized to describe the bicycle accessory mounting structure should be interpreted relative to a bicycle equipped with the bicycle accessory mounting structure as used in the normal riding position on a horizontal (level) surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle accessory mounting structure comprising:
   a first stem member including a mounting opening and defining a portion of a support passage for a bicycle handlebar;
   a second stem member configured to be attached to the first stem member and defining a remaining portion of the support passage, the second stem member being configured to be attached to a bicycle steerer tube; and
   a base member including an accessory attachment portion and a mounting portion,
   the base member extending through the mounting opening, and the mounting portion of the base member being slidably supported on the first stem member and configured to be disposed between the bicycle handlebar and the first stem member when the first and second stem members support the bicycle handlebar, the base member including at least two threaded holes that are each threadedly engaged with a separate mounting bolt, the mounting bolts passing through the mounting opening to secure the accessory attachment portion to the mounting portion.

2. The bicycle accessory mounting structure according to claim 1, wherein
   the first stem member further includes a recess formed in a first surface defining the portion of the support passage, the mounting portion of the base member being slidably disposed in the recess.

3. The bicycle accessory mounting structure according to claim 1, wherein
   the mounting opening of the first stem member is an elongated slot.

4. The bicycle accessory mounting structure according to claim 1, wherein
   the accessory attachment portion and the mounting portion are separate members.

5. The bicycle accessory mounting structure according to claim 1, wherein
   the mounting portion includes a threaded hole that is threadedly engaged with a mounting bolt such that the accessory attachment portion is secure to the mounting portion.

6. The bicycle accessory mounting structure according to claim 1, wherein
   the accessory attachment portion includes an accessory mounting rail.

* * * * *